April 15, 1941.  E. H. STEEDMAN  2,238,573
LIFT FOR RAISING MOTOR VEHICLES
Filed Dec. 5, 1938  5 Sheets-Sheet 3
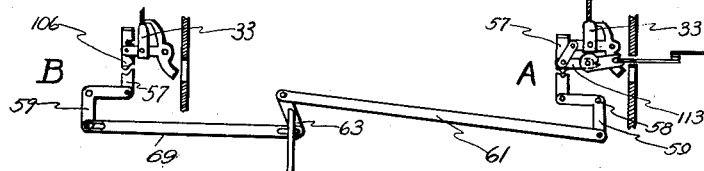
Fig. 4
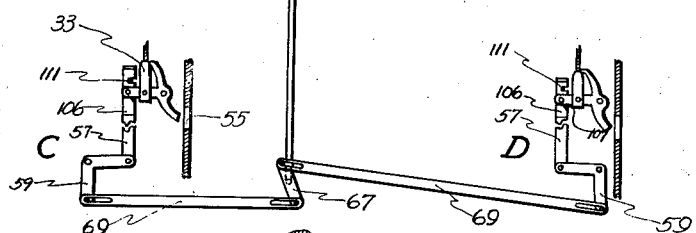
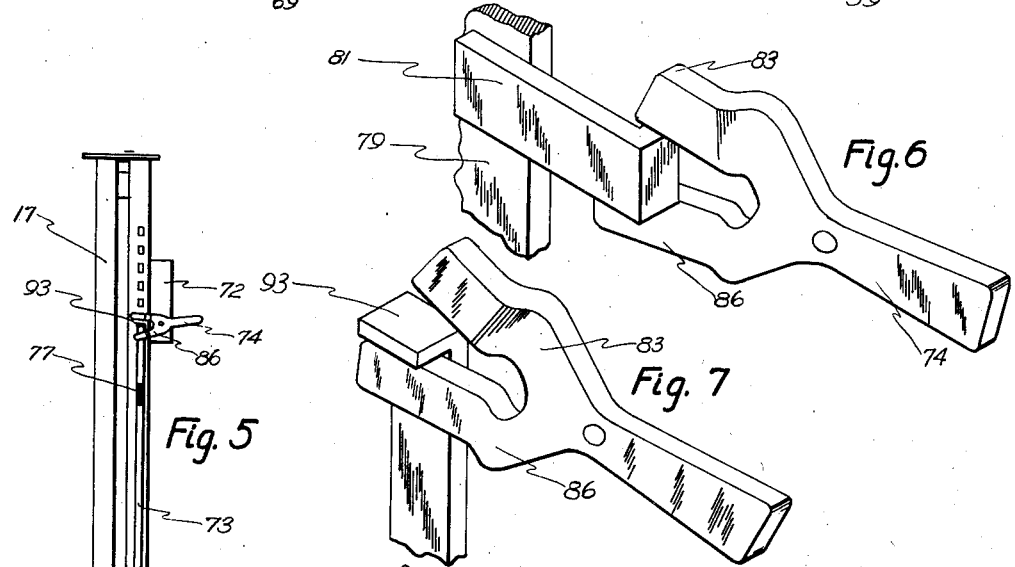
Fig. 6
Fig. 7
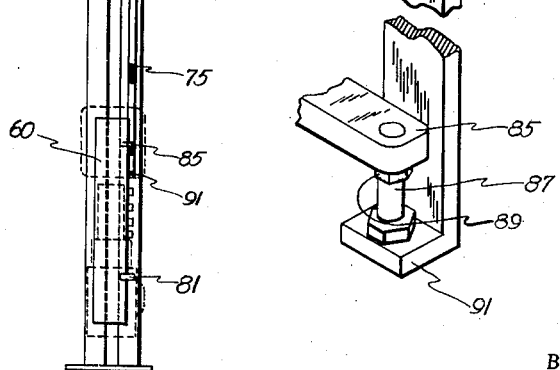
Fig. 5
INVENTOR.
EDWIN H. STEEDMAN
BY
Roy M. Eilers
ATTORNEY.

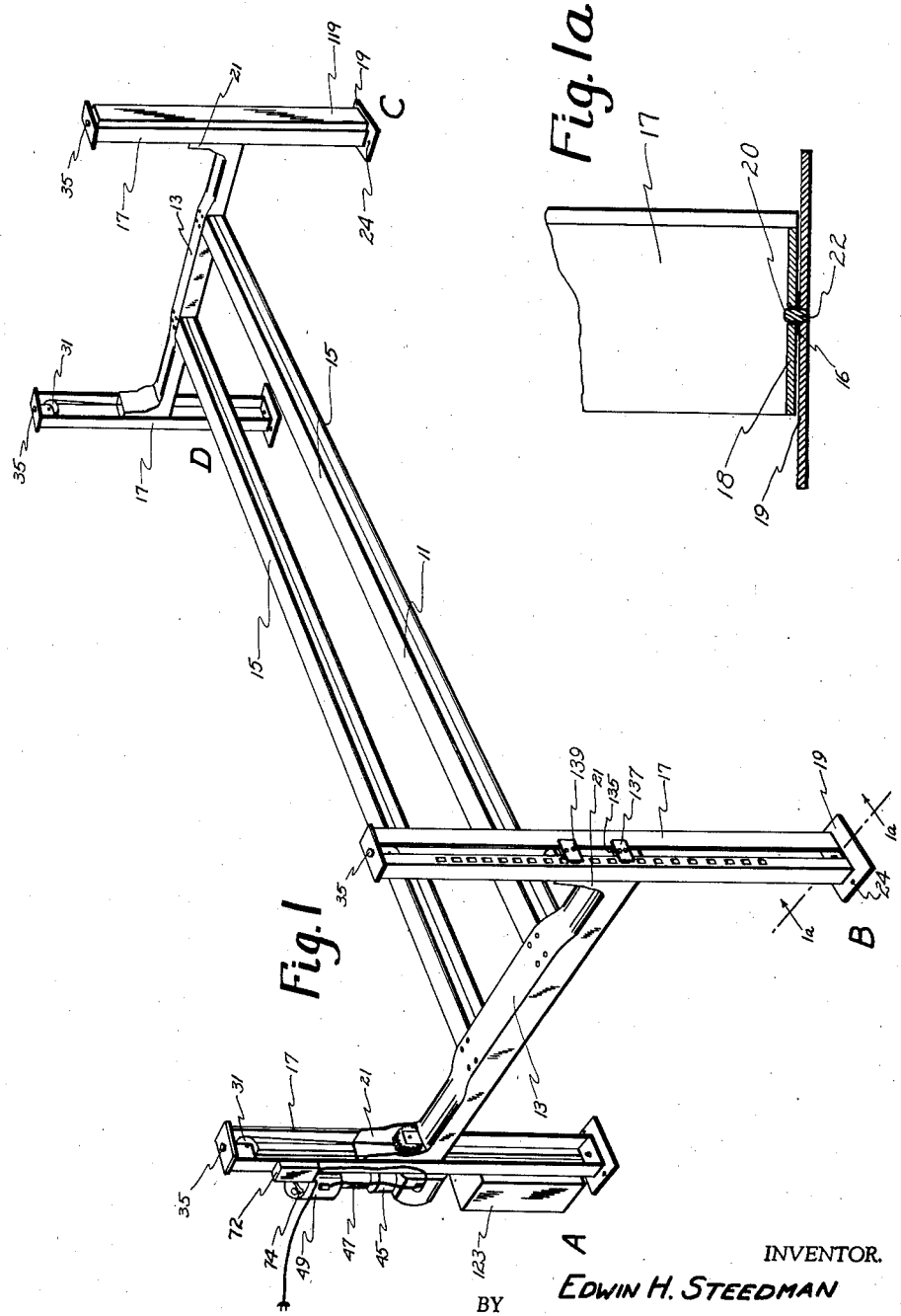

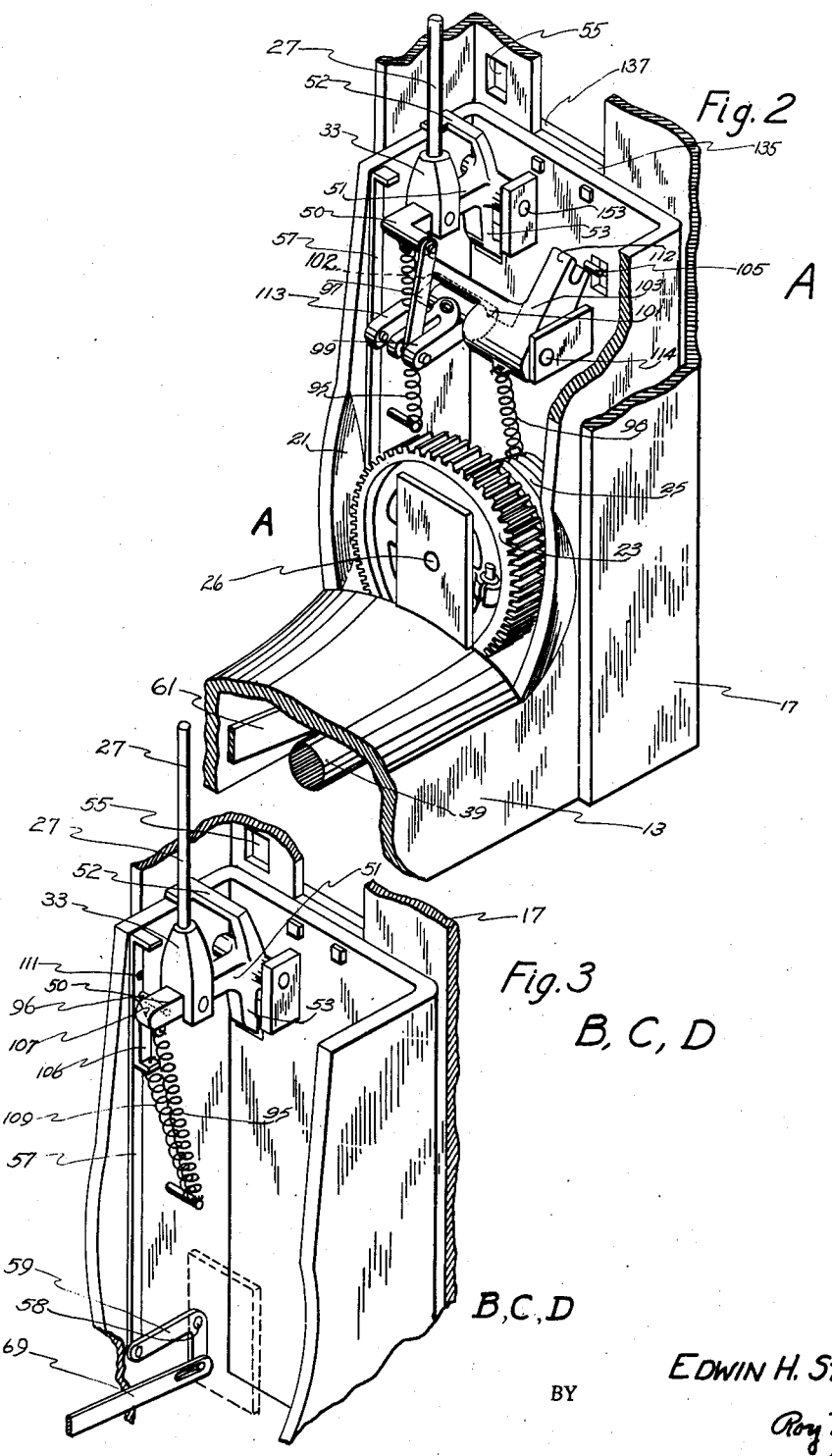

April 15, 1941. E. H. STEEDMAN 2,238,573
LIFT FOR RAISING MOTOR VEHICLES
Filed Dec. 5, 1938 5 Sheets-Sheet 4
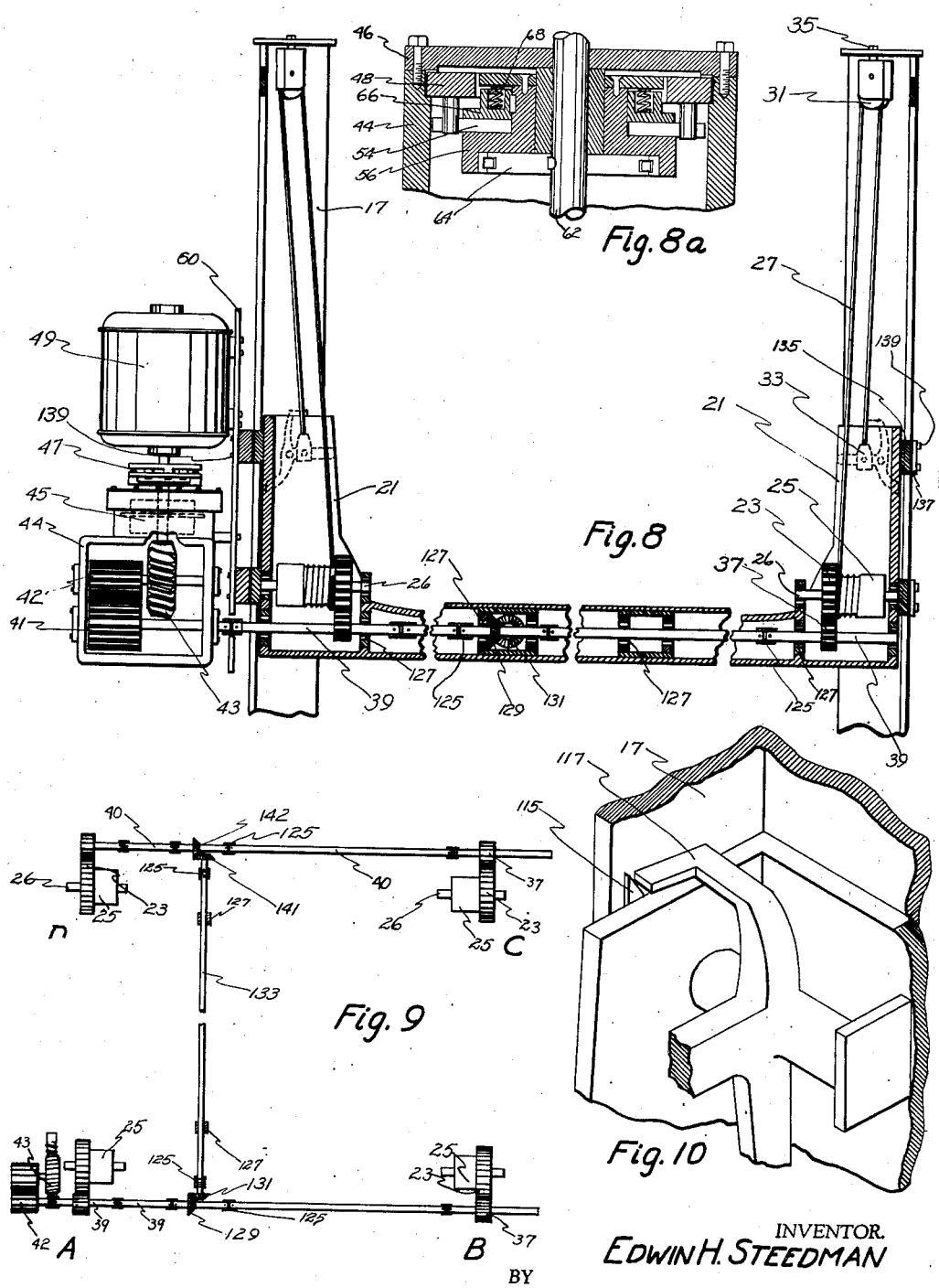
INVENTOR.
EDWIN H. STEEDMAN
BY Roy M. Eilers
ATTORNEY.

April 15, 1941.    E. H. STEEDMAN    2,238,573
LIFT FOR RAISING MOTOR VEHICLES
Filed Dec. 5, 1938    5 Sheets-Sheet 5
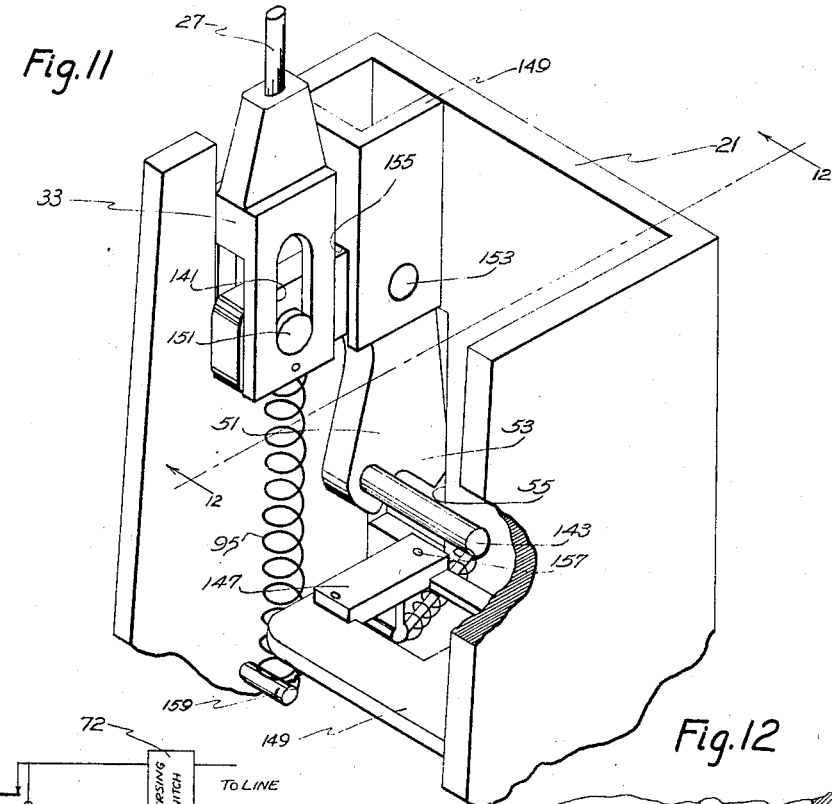
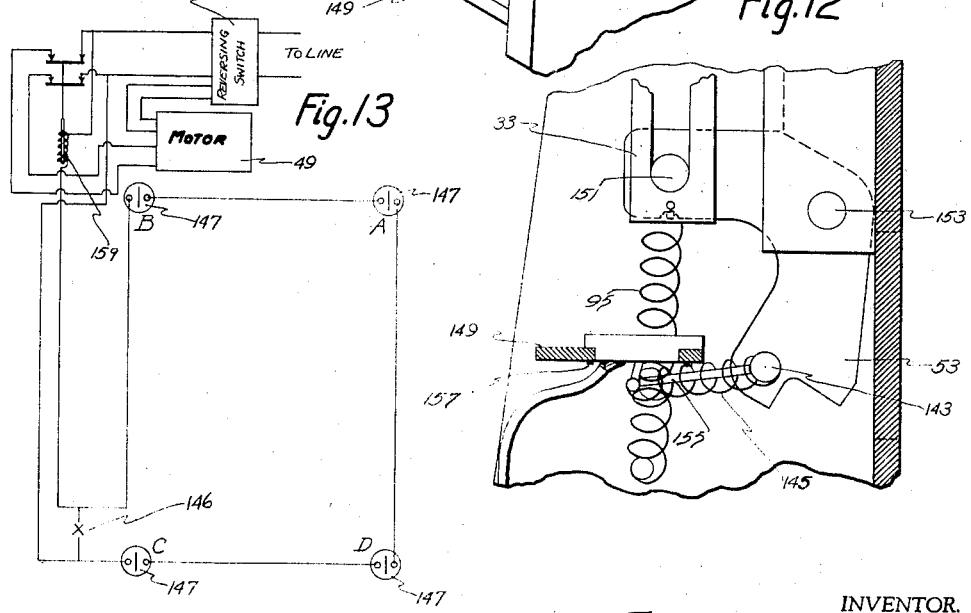
INVENTOR.
EDWIN H. STEEDMAN
BY
Roy M. Eilers
ATTORNEY.

Patented Apr. 15, 1941

2,238,573

UNITED STATES PATENT OFFICE 2,238,573

LIFT FOR RAISING MOTOR VEHICLES

Edwin H. Steedman, St. Louis, Mo., assignor to Curtis Manufacturing Company, Wellston, Mo., a corporation of Missouri Application December 5, 1938, Serial No. 244,001

12 Claims. (Cl. 254—144)

It is an object of this invention to provide an improved auto lift.

The lift provided by this invention is free from interfering cross members between corner posts.

It is provided with safety stop dogs which will hold the platform at any height if a cable should break, and a safety mechanism which immediately stops operation of the lift and prevents an auto from tipping off if a cable breaks or if the lift meets an obstruction as it is being lowered.

It is provided with means to allow its proper installation and operation, even though the floor surface is not perfectly flat or level.

It has means to maintain spacing and alignment of its supporting columns without depending on permanent securement to the floor which makes it possible to use light floor fastenings and to change the location of the lift with ease. Further objects and advantages will appear from the following detailed description and accompanying drawings.

For the purpose of illustration, I will now describe one form of lift embodying my invention which I have found to operate satisfactorily. It is to be understood that this description is for the purpose of illustration only and the scope of the invention is not to be limited thereby but is to be defined by the appended claims.

In the accompanying drawings, the same reference numerals indicate the same or similar parts in all the views.

Fig. 1 is a perspective view of an automobile lift embodying my invention.

Fig. 1a is an enlarged fragmentary vertical sectional view taken along line 1a—1a of Fig. 1.

Fig. 2 is a fragmentary perspective view of the motor corner A of the lift.

Fig. 3 is a fragmentary perspective view of one of the other corners B, C, or D, shown without the driving gear and drum, for sake of clarity.

Fig. 4 is a diagrammatic view of one type of safety mechanism as applied to the lift.

Fig. 5 is a side view of the post of the motor corner showing particularly the control mechanism.

Fig. 6 is an enlarged fragmentary perspective of the handle and the upper limit trip shown in Fig. 5.

Fig. 7 is an enlarged fragmentary perspective of the handle and the lower limit trip shown in Fig. 5.

Fig. 8 is a vertical sectional view showing the motor drive mechanism and the cross drive as well as the lifting mechanism in the corner posts. The safety mechanism has been omitted from this view for the sake of clarity.

Fig. 8a is a longitudinal cross-sectional view of the brake mechanism indicated by numeral 45 in Fig. 8.

Fig. 9 is a diagrammatic view of the driving mechanism of the lift.

Fig. 10 is a fragmentary perspective of one type of mechanical safety mechanism at one corner taken when the platform is near the floor.

Fig. 11 is a fragmentary perspective of a type of electrical safety mechanism as applied at each of the four corner posts of the lift.

Fig. 12 is a view taken along 12—12 of Fig. 11.

Fig. 13 is a diagram of the wiring of the electrical safety mechanism shown in Fig. 11 applied to all four corners.

Lifting mechanism

Referring to the drawings and particularly to Figs. 1 and 8, a platform 11 consisting of end bunks 13 and platform beams 15 may be positioned between corner posts 17. The corner posts may have web portions 14 provided with vertical slots 16. The corner posts may have plates 18 on their bottom ends provided with openings 20 which may fit over pins 22. Washers 16 may be provided and may be placed on the pins 22 which may be secured to a base plate 19. These base plates may in turn be secured to the floor by any suitable means as, for instance, expansion bolts 24. At the ends of each end bunk, an upright channel 21 may be secured. This serves to support gear 23 and winding drum 25 on shaft 26. In each corner, cables 27 may be secured at one end to the drum 25. They pass over pulleys 31 supported from the top of posts 17 by bolts 35, and are secured at their other ends to members 33 which in turn are connected with the upright channels 21 as will later be described. The upright channels 21 which move up and down in the corner posts 17 are provided with sliding guide means near the top and bottom which allow movement between the channel and corner post and at the same time, maintain the corner post in proper alignment. The guides may take the form of plates 135 and 137 secured to upright channels 21 by bolts 139 which slide in the vertical slots 16. The plates 135 and 137 slidingly engage opposite sides of the web 14.

In order that the corner posts will be vertical when the platform is loaded, they are designed to lean outwardly when there is no load on the lift. Thus, under load, the guides on the upright channels of each corner will ride smoothly up and down the corner posts and will not bind. Since the corner posts are designed to stand vertically under load, they will lean outwardly under no load and the guides may bind slightly but since there is no load on the lift, the motor easily overcomes this. The long platform beams 15 may be cambered so that on loading they will assume a substantially horizontal position. The guide means maintain each corner post in a substantially vertical position independently of any floor securing means. The base plates 24 are used to prevent the lift from moving around on the floor and not to hold the columns vertical. The corner posts are not secured to these plates, but may be easily removed from the pins and the entire lift moved to a new position, ether over new plates 24, or over the old ones which may easily be moved. No digging or special foundations are necessary with this lift.

Since the guide means maintain the vertical alignment of the corner posts at all times, it is not necessary to brace the corner posts or to provide cross beams or braces for them which would interfere with access to the car or which might damage an auto door if it should be left open while the lift is in operation.

Driving mechanism

Referring particularly to Figs. 2 and 8, the motor 49 and gear box housing 44 are mounted on plate 60, secured through bolts 139 to one of the upright channels 21 on the outside of corner post 17 of corner A. The motor drives shaft 39 through a flexible coupling 47, a brake 45, worm gear and wheel 43, and gears 41 and 42. Gear 41 is secured to a section of shaft 39.

The brake 45 is of a type well known in the art provided with an over-running clutch to allow the shaft with which it is connected to rotate freely in one direction and to retard the rotation of the shaft in the opposite direction. As arranged on the lift, the shaft rotates freely when in the direction to raise the platform but the brake in connection with the over-running clutch retards the shaft when the platform is lowered. The braking force may be such as to make it necessary to run the motor to lower the platform. Details of the brake are shown in Fig. 8a where 44 is the gear box housing provided with a cover 46. The cover clamps the ring 48 against rotation. Ring 48 is provided with pins which fit into openings in brake lining 54 to hold it against rotation. A member 56 is coupled to shaft 62 by an over-running clutch 64. The over-running clutch may be any one of the many kinds well known in the art and is arranged to allow free movement between shaft 62 and member 56 when the shaft is rotating in a direction to raise the lift, but to couple member 56 to the shaft when it rotates in the direction to lower the lift. A ring 66 and member 56 are held against brake lining 54 by springs 68. The brake may be released by loosening the cover 46 which will allow ring 48 to rotate. Such a release is often useful, if the electric power fails, and allows the lift to be lowered.

Couplings 125 unite various sections of shafts 39, 40, and 133. Pinions 37 secured to the sections of shafts 39 and 40 within the upright channels, drive gears 23 and drums 25 which rotate on the stub shafts 26. Bevel gears 129 and 131 drive the long shaft 133 from shaft 39. Shaft 133, in turn, drives cross shaft 40 in the other end bunk through bevel gears 141 and 142. Bearings 127 support the various sections of the shafts. It should be noted that the two bearings supporting the long shaft 133 are positioned to allow shaft 133, which is long and slender, to bend with beams 15 without binding. The couplings 125 are an additional aid to the flexibility of the driving mechanism as they allow the various shafts to bend and flex with the load on the lift without causing the bearings to bind.

Safety mechanism

It is possible to provide various types of safety mechanisms for the lift and I now describe one form of mechanical safety mechanism which I have found to operate satisfactorily.

Referring now particularly to Figs. 2, 3, and 4, the upright channel 21 of corner A is provided with a lever 57 pivotally secured at one end to a bell crank 59 which in turn is supported on channel 21 by pivot 58. Lever 113, the purpose of which will be later demonstrated, is also pivotally secured to lever 57. Link 61, in corner A (see Fig. 4) is pivotally secured at one end to bell crank 59 and at the other end to one arm of crank 63. Crank 63 is secured at its center to shaft 65 which runs along one of the platform beams to the center of a second crank 67. The other arm of crank 63 is connected by slotted link 69 through bell crank 59 to lever 57 of corner B. The ends of crank 67 are connected as shown by slotted links 69 through bell cranks 59 to levers 57 of corners C and D. The lever 57 in corners B, C, and D is slotted near the top to receive pin 111 which may be secured to the upright channels. Short bars 106 with inclined edges 107 are secured to the levers 57 in corners B, C, and D. A spring 109 holds lever 57 securely on pin 111.

In corner A; lever 113 rotates on shaft 114 and is secured to lever 57; yoke 99 also rotates on shaft 114 and is provided with a lip 101; lever 113 is provided with a similar lip 102; both lips engage a flat face of member 103 which rotates on shaft 114 independently of lever 113 and yoke 99; an arm 112 of member 103 is slotted to engage switch arm 105 and yoke 99 is connected by link 97 to member 51.

In all the corners; member 51 is pivoted on pin 153; member 33 is pivotally secured to one arm 50 of member 51 while a second arm or safety dog 53 of member 51 is positioned to enter holes 55 provided at spaced intervals in the corner posts 17; a third arm 52 of member 51 extends over the edges of upright channel 21 to prevent member 51 from rotating.

95 and 96 are springs whose purpose will later appear. 105 is the lever of an electric switch which is connected in the motor circuit.

Operation of mechanical safety

This safety mechanism will stop the operation of the lift and provides means to hold the platform in position should any one or all of the cables break or should some other part of the mechanism fail. It will also stop the lift if the platform meets with an obstruction while it is being lowered. If this was not done, the platform would tilt badly and might allow a car to overturn since the part of the platform supported by the obstruction would remain uplifted while the other parts of the platform might continue their downward movement.

Should a cable in corner A break, or become slack because of an obstruction under that portion of the platform, spring 95 will pull down member 51 and cause safety dog 53 to engage one of the slots 55. Since the member 51 is connected by link 97 to yoke 99, the yoke will also be pulled down by the spring 95. Downward movement of yoke 99 will cause the lip 101 to engage and rotate member 103 to cause its arm 112 to throw the switch lever 105 and stop the motor 49. Spring 96 aids the throwing of the switch lever.

In corners C or D (in Fig. 3) if the cable 27 becomes slack, spring 95 will pull down member 51 to cause safety dog 53 to enter one of the slots 55. At the same time, this action will force pin 96 which is secured in member 51 to slide down the inclined surface 107 of bar 106 and push the lever 57 outward. The outward movement of lever 57 will disengage it from pin 111 and allow spring 109 to pull it down. As lever 57 is pulled down, it will rotate the bell crank 59 which will move member 69. This movement of member 69 will rotate crank 67 and shaft 65. Rotation of shaft 65 will cause crank 63 which is secured to shaft 65 to push member 61 and force bell crank 59 in corner A to rotate and pull down lever 57 in corner A. Downward movement of lever 57 in corner A will cause lever 113 to rotate so that its lip 102 will engage and rotate member 103 to cause its arm 112 to throw switch lever 105.

Trouble in corner B will in like manner stop the lift and engage the safety dog.

The safety mechanism is rendered inoperative when the platform is within a few inches of the ground by a projecting ear 117 of member 51 which strikes a ramp bar 115 (see Fig. 10) secured to the bottom of posts 17 to prevent member 51 from rotating. This prevents rocks or ground irregularities from operating the safety mechanism.

It will be noted that the safety mechanism in any of the corners B, C, or D can be tripped independently of that in the other corners. For instance, if on corner D, lever 57 is tripped by the action of member 51 because of a slack cable or other cause, bell crank 59 will turn and throw link 69 to turn crank 67, shaft 65, crank 63, link 61, the bell crank of corner A, and the lever 57 in corner A to open the switch 105. In the meantime, link 69 of corners B and C will not move because of the slots in the ends of these links. If the safety mechanism on any of the corners B, C, or D is tripped, the switch in corner A will open since link 61 is connected to crank 63 and bell crank 59 without the slots found in similar links 69.

After the safety mechanism has come into operation because of a broken cable or an obstruction under the platform, it is necessary to reset it after making the necessary repairs or removing the obstruction. This is done by raising the lever 57 to its normal position in the corner affected.

*Electric safety mechanism*

In Figs. 11, 12, and 13, another type of safety mechanism is shown which may replace the one just described. In the upright channels 21 of all corners, the members 51 are rotatably supported on pivots 153 within supporting angles 149.

Members 33 are here provided with slots 141. The pins 151 secured through members 51 permit the free movement of members 33 or members 51 throughout the length of the slots 141. Members 51 turn on pins 153 and are pulled up securely against the faces 155 of angles 149 by the cables 27. One arm of member 51 in each corner is provided with a pin 143 and safety dog 53. A spring 145 over a compression rod 155 is secured at one end to pin 143 and at the other end to a switch 147. The switch is held in place on bracket 149 by bolts 157. Bracket 149 is secured to upright channel 21. Fig. 13 shows diagrammatically the electrical connections of these switches in each corner. The switches 147 are connected in series with a relay 159 which controls motor 49. The relay is arranged to open the motor circuit when it is not energized and to close the motor circuit when it is energized. Thus when any one of the switches 147 are in the off position or any of the wiring becomes broken, the relay will stop the lift motor. The switch box 72 houses a suitable control switch provided with an up, down, and off position. It is a motor reversing switch provided with an off position and its operation will be later described in connection with the control mechanism.

*Operation of electric safety mechanism*

Should cable 27 become slack because of trouble, or break, member 33 will be pulled down by spring 95 through the length of slot 141 onto pin 151 and will rotate member 51 until member 51 causes pin 143 to tension spring 145 and open the switch 147. Opening of the switch 147 will through relay 159 stop motor 49 and further movement of all other corners of the platform and prevent upsetting the automobile on the platform. The defective cable or part may then be replaced. To reset the safety mechanism, by one method, a switch 146 shunted across the safety switches in the corners may be held closed until the lift is run up by the main switch. This tightens the cable in the defective corner and the compression rod 155 will reset switch 147 when member 51 is rotated by upward movement of member 33. The lift will then be ready for normal operation after switch 146 is opened.

*Control mechanism*

Referring particularly to Figs. 5, 6 and 7, a switch box 72 provided with a switch handle 74 controls the motor 49. The switch handle and the switches in the switch box are arranged so that upward movement of the handle operates the motor to raise the platform, while downward movement of the switch handle operates the motor to lower the platform. A central or horizontal position of the switch handle stops the motor. The handle is biased to the central or off position as a safety measure so that removal of an operator's hand will stop the motor. An upper and lower limit mechanism is provided by a bar 73 secured to post 17 by bolts 75. Longitudinal movement of the bar is permitted by slots 77. A projection 81 on plate 50 is designed to engage an offset arm of switch handle 83 to limit the upward movement of the platform. Another projection 85 on the plate 79 is provided with a bolt 87 and lock nut 89 to limit the downward movement of the platform by striking a turned out portion 91 on bar 73. As bolt 87 engages turned out portion 91, the bar 73 is pulled down and another turned out portion 93 at the top of bar 73 engages an offset 86 on switch handle 74 to limit the downward movement of the platform. The electrical connections of switch 72, when used in conjunction with the electrical safety mechanism, are shown in Fig. 13. When used with the mechanical type of safety mechanism, the switch 72 is connected between the motor and the current supply as shown in Fig. 1. The switch lever 105 operates any electric switch of the usual type which is placed in the motor lines to open the motor circuit when in the "off" position.

*Operation of the lift*

If an operator desires to raise the platform of the lift, he pushes handle 74 up. This will close the switches in switch box 72 and start the motor 49 in the proper direction for raising the platform.

If the operator fails to return the handle to off position when the platform reaches the top, the projection 81 strikes offset arm 83 on switch handle 74, takes the switch handle out of operator's hand, and returns it to off position. To lower the platform, the operator pulls down switch handle 74 to operate switches in box 72 and reverse motor 49 to lower the platform. The platform will move downward until the operator stops it or bolt 89 on projection 85 strikes the turned out portion 91. This causes the turned out portion 93 to engage the offset arm 86 of switch handle 74 to take the switch handle out of the operator's hand and return it to the off position.

Operation of the lift is not impaired by the uneven floor surfaces usually found in the average garage or display room. Differences in the height of the corner posts may be compensated for by turning bolt 35 to raise or lower pulleys 31. This permits the corners to be adjusted separately so that an equal tension will be placed on all cables 27 and the platform 11 will be held horizontal.

The lift may be used either indoors or outdoors and is designed so as not to be affected by the weather. Various covers may be provided to protect the various parts of the lift against damages as well as to protect persons from contact with the moving parts. Thus, in Fig. 1, one corner post is shown with a cover 119 while another corner carries a cover 121 over the mechanism in the upright channel. At the motor corner, a cover 123 forms a protective housing for the motor and gear mechanism when the lift is lowered. It should be particularly noted that the posts of the lift are not braced at the top and there are no overhead bars or cables to damage vehicle doors, etc.

The safety slots punched at intervals in the post throughout the entire operating height of the lift into which the safety dogs enter when a cable breaks and the quick-acting mechanical or electrical safety mechanism which renders the entire device inoperative until the trouble is remedied, provide an extremely safe mechanism. The "dead-man" switch prevents operation of the lift unless an operator is in attendance and the upper and lower limit controls guard against inattention of the operator.

While the above description and the accompanying drawings illustrate a preferred embodiment of my device, I do not wish to limit it to the specific construction and arrangement of parts shown as various modifications, substitutions, additions, and omissions may be made without departing from the spirit and scope of my invention as defined by the appended claims.

I claim:

1. A car lift comprising a plurality of independently tiltable vertical members, a car-supporting device, vertically spaced means on the car-supporting device engaging the vertical members for holding them in proper alignment, means for raising and lowering the car-supporting device in conjunction with the vertical members including winding drums on the car-supporting device adjacent the vertical members, a windable member supported from each vertical member and secured so as to be wound on the drum adjacent thereto and driving means on the car-supporting device to rotate said drums, a latch member carried by the car-supporting device adjacent each vertical member, and means to move the latch member adjacent a particular vertical member into engagement with said vertical member whenever the windable member supported from the particular vertical member becomes slack or breaks.

2. A car lift comprising a plurality of vertical members, a car-supporting device, means for raising and lowering the car-supporting device in conjunction with the vertical members including winding drums on the car-supporting device adjacent the vertical members, a windable member supported from each vertical member and secured so as to be wound on the drum adjacent thereto and driving means to rotate said drums, a latch member carried by the car-supporting device adjacent each vertical member, and means to move the latch member adjacent a particular vertical member into engagement with said vertical member whenever the windable member supported from the particular vertical member becomes slack or breaks and an electric switch effective to stop the driving means when any of the latch means move to engage a vertical member.

3. A car lift comprising a plurality of vertical members, a car-supporting device, hoisting means to raise and lower the car-supporting device in conjunction with the vertical members, a driving means therefor, safety means to support the car-supporting device and stop the driving means whenever the hoisting means fails and means to render the safety means inoperative when the car-supporting device is within a predetermined distance of the ground.

4. A car lift comprising a plurality of vertical members, a car-supporting device, hoisting means to raise and lower the car-supporting device in conjunction with the vertical members, an electric motor driving the hoisting means, a latch member on the car-supporting device adjacent each vertical member for engagement therewith if the hoisting means fails, and an electric switch cooperating with each latch member effective to stop the electric motor should the latch member move toward engagement with the vertical member.

5. A car lift comprising a plurality of vertical members, a car-supporting device engaging said members, means to raise and lower the car-supporting device in conjunction with the vertical members including winding drums on the car-supporting device adjacent the vertical members, windable members supported from each vertical member and adapted to be wound on the adjacent winding drum and driving means connecting the winding drums for simultaneous rotation, latch members on the car-supporting device adjacent the vertical members biased for engagement therewith, one end of each windable member connected to a latch member to prevent its engagement with the vertical member as long as the windable member is tight.

6. A car lift comprising a plurality of independently movable vertical members, a car-supporting device including end cross members provided with uprights at their ends, means spaced apart on each upright for engaging the vertical members and maintaining them in proper alignment, winding drums supported by each upright and windable means supported by the vertical members and secured so as to be wound on the winding drums.

7. In a car lift four vertical corner posts, a car-supporting platform arranged to permit a car to be driven upon it, said platform being provided with end cross members engaging the corner posts, winding drums on the platform adjacent the corner posts, latches on the platform for cooperation with each of the corner posts, a pulley supported by each corner post, a rope or chain passing over each pulley and having one end secured to the latch and the other end secured so as to be wound on the winding drum, an electric motor carried by the platform and connected for driving the winding drums, means for moving the latches into engagement with their respective corner posts should the rope or chain in that corner break or become slack and an electric switch operated by movement of any of the latch means toward the post-engaging position to stop the electric motor.

8. A car lift comprising a plurality of vertical members, a car-supporting platform, lifting means adjacent each vertical member cooperating to raise and lower the platform in conjunction with the vertical members, a motor for driving the lifting means, a safety device adjacent each vertical member adapted to support the portion of the platform supported by the lifting means cooperating with the vertical member should the lifting means fail, and means to stop the driving motor whenever any of the safety means operates to support its portion of the platform.

9. A car lift comprising a plurality of vertical channels, a car-supporting device supported thereby, said car-supporting device including a longitudinal member, a cross member at each end of the longitudinal member, said cross members being provided with uprights at their ends, said channel members having a vertically extending slot in the web thereof, said uprights being positioned in the concave portion of the channel members having parts thereof slidably engaging the inside of the web of the channel members and provided with vertically spaced projections extending through the slots, means secured to said spaced projections on the opposite side of the channel web slidably engaging the channel web, and means for raising and lowering the car-supporting device in conjunction with said channel members.

10. A car lift comprising a plurality of vertical channels, a car-supporting device supported thereby, said car-supporting device including a longitudinal member, a cross member at each end of the longitudinal member, said cross members being provided with uprights at their ends, said channel members having a vertically extending slot in the web thereof, said uprights being positioned in the concave portion of the channel members having parts thereof slidably engaging the inside of the web of the channel members and provided with vertically spaced projections extending through the slots, means secured to said spaced projections on the opposite side of the channel web slidably engaging the channel web, means for raising and lowering the car-supporting device in conjunction with said channel members including winding drums on the car-supporting device adjacent the vertical members and a rope supported from each vertical member and secured so as to be wound on the drum adjacent thereto, and driving means to rotate said drums.

11. A car lift comprising a plurality of vertical members, a car-supporting device supported thereby, said car-supporting device comprising a longitudinally extending member and a cross member at each end thereof, the end of each cross member being provided with a portion engaging the vertical members, said portions having a bell crank latch secured thereto, a rope supported by each vertical member and having one end thereof secured to one end of the bell crank latch, said vertical members being provided with a plurality of spaced openings, said bell crank being spring biased whereby its other end will engage said openings when the tension on the rope is relaxed, winding drums supported on each end of the cross members adapted to wind the other end of the rope thereon and means to rotate said drums simultaneously.

12. A car lift comprising a plurality of vertical members, a car supporting device, hoisting means to raise and lower the car supporting device in conjunction with the vertical members, an electric motor driving the hoisting means, a latch member on the car supporting device adjacent each vertical member for engagement therewith if the hoisting means fails, and an electric switch for said electric motor effective to stop the electric motor should any of the latch members move toward engagement with the vertical member.

EDWIN H. STEEDMAN.